United States Patent [19]

Sudo et al.

[11] 4,429,210
[45] Jan. 31, 1984

[54] HEATING DEVICE

[75] Inventors: Shigeru Sudo, Tokyo; Masaaki Yada, Kawasaki, both of Japan

[73] Assignee: Tokyo Shibaura Denki Kabushiki Kaisha, Kawasaki, Japan

[21] Appl. No.: 332,829

[22] Filed: Dec. 21, 1981

[30] Foreign Application Priority Data

Dec. 26, 1980 [JP] Japan .................. 55-185837

[51] Int. Cl.³ .............................................. B23K 27/00
[52] U.S. Cl. ..................... 219/121 LW; 219/121 LE
[58] Field of Search .... 219/121 LW, 121 L, 121 LM, 219/121 LE, 121 LF, 121 LQ, 121 LP, 121 LU, 121 LH, 121 LJ; 65/111

[56] References Cited

U.S. PATENT DOCUMENTS 3,225,206 12/1965 Strong et al. ............... 219/121 LW
3,848,104 11/1974 Locke ......................... 219/121 LW

FOREIGN PATENT DOCUMENTS 54-101596 8/1979 Japan .
54-118854 9/1979 Japan .

*Primary Examiner*—C. L. Albritton
*Attorney, Agent, or Firm*—Oblon, Fisher, Spivak, McClelland & Maier

[57] ABSTRACT

A heating device comprises a laser oscillator which emits a laser beam, a reflector which guides the laser beam from the laser oscillator to an object a support pole for supporting the reflector to pivotally oscillate about an axis substantially perpendicular to an axis of the object, and a pair of electromagnets for oscillating the reflector between a maximum tilted position in one direction and a maximum tilted position in an opposite direction and for stopping the reflector at both maximum tilted positions for a predetermined period. The laser beam which is incident on the reflector reciprocally scans the object in the axial direction of the predetermined range thereof by the oscillation of the reflector.

10 Claims, 7 Drawing Figures

HEATING DEVICE

BACKGROUND OF THE INVENTION

Field of the Invention:

The present invention relates to a heating device which uses a laser beam and, more particularly, to a heating device for heating a region to be heated in a predetermined temperature range.

Description of the Prior Art:

The laser beam has recently been used for heat treatment of metal and a softening process for glass, quartz and the like. In this case, the spot diameter of the laser beam is generally relatively small. When the heated region is large, the heated region must be reciprocally scanned by the laser beam for heating.

As a method in which the heated region is reciprocally scanned by the laser beam for heating, one method is conventionally adopted in which a laser beam is radiated on an object to be heated through a reflecting mirror, and the reflecting mirror is oscillated at a constant amplitude and frequency so that the laser beam which is incident moves reciprocally.

However, when the reflecting mirror is simply oscillated as described above, the heated region may not be uniformly heated. For this reason, if uniform heating is required, for example, Japanese Laid-Open Patent Application 54-101576 proposes that the power of the laser beam be changed in response to the displacement of the reflecting mirror. However, changes in the power of the laser beam may not easily be accomplished and this device entails higher cost.

SUMMARY OF THE INVENTION

It is the object of the present invention to provide a heating device for heating a region to be heated, at a low manufacturing cost, in which a relatively large region to be heated is entirely heated within a desired temperature distribution with a laser beam.

In order to achieve the above and other objects of the present invention, there is provided a heating device in which an optical guide member, preferably a reflecting mirror, pivotally oscillated along the axis of an object to be heated so as to guide and reciprocally scan a laser beam over the predetermined region, stopping at a maximum inclination in one direction and at a maximum inclination in the other direction for a predetermined period of time. In a preferred embodiment, a pivotal oscillation mode of the optical guide member is determined so that the stopping period at each maximum tilted position is substantially the same or shorter than the period of pivotal movement between the maximum tilted positions.

The optical guide member which is pivotally oscillated in accordance with the mode as described above is used to reciprocally scan the object to be heated with the laser beam. The predetermined region of the object to be heated is entirely uniformly heated within a substantially uniform temperature distribution. Furthermore, a sophisticated and/or expensive means is not required for oscillating the optical guide member in the manner as described above.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

A heating device which uses a laser beam will be described with reference to the accompanying drawings according to one embodiment of the present invention.

Figure 1:
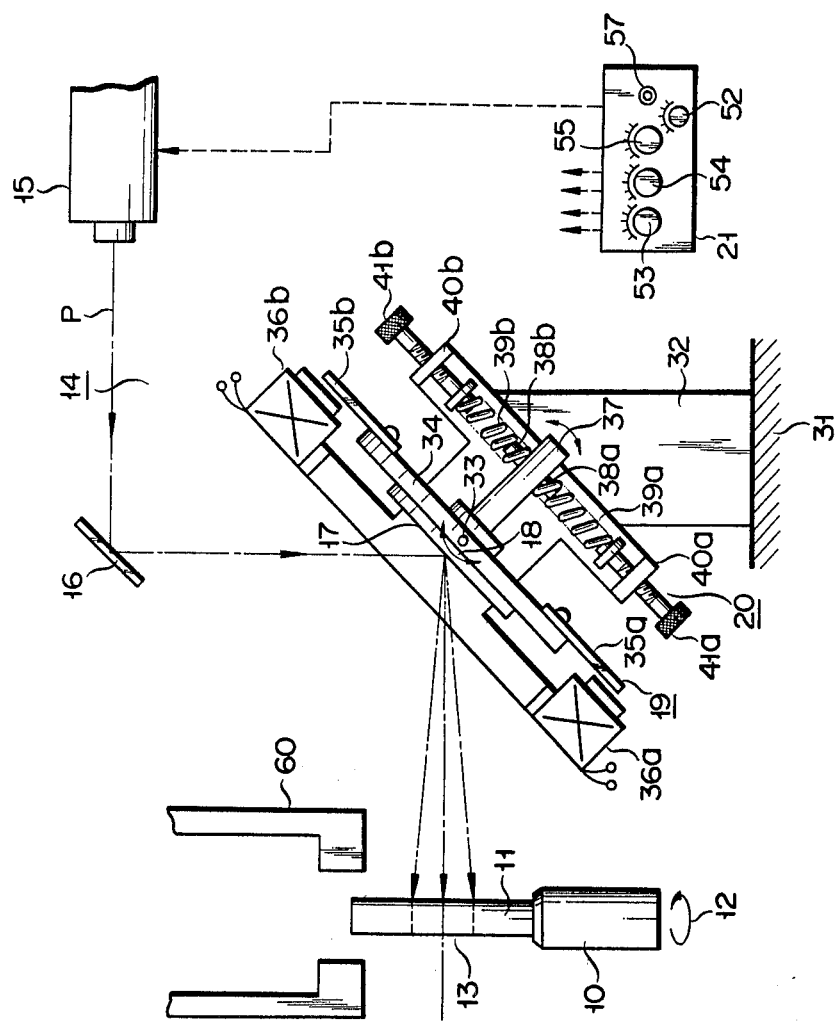
FIG. 1 is a view schematically illustrating a heating device according to one embodiment of the present invention.

FIG. 1 shows a process in which a predetermined region of a quartz tube is entirely uniformly softened by the heating device according to the embodiment of the present invention.

Referring to FIG. 1, the reference numeral 10 denotes a chuck which supports a quartz tube 11 as an object to be heated, perpendicularly to the plane of the chuck 10. The quartz tube 11 rotates in the direction indicated by an arrow 12 about the vertical central axis of the quartz tube 11. A heating device 14 is spaced apart from the quartz tube 11 at a predetermined distance in order to heat a prospective heating region 13 of the quartz tube 11.

The heating device 14 comprises a laser oscillator or laser beam radiation device 15, first and second reflecting mirrors 16 and 17 which guide a laser beam P emitted from the laser oscillator 15 to the region 13, a drive mechanism 19 which pivotally oscillates the reflecting mirror 17 in the direction indicated by arrow 18, a free oscillation force biasing mechanism 20 which biases the reflecting mirror 17 to assure free pivotal oscillation, and a controller 21 which controls the operation timing and period of laser beam emission from the laser oscillator 15 and the operation timing and period of the drive mechanism 19.

The drive mechanism 19 is arranged in the manner to be described below. A support member or a support column 32 extends from a stationary member 31. One upper side of the support column 32 is flat. A pin 33 is fixed on the flat upper side to extend perpendicularly therefrom. The pin 33 extends through a through hole which is formed in the central section of a side surface of a reflecting mirror support plate 34. Therefore, the support plate 34 is supported by the support member 32 so as to be pivotal about the pin 33. At the center of the upper surface of the reflecting mirror support plate 34 is supported the second reflecting mirror 17, the reflecting surface of which faces upward and which is parallel to the reflecting mirror support plate 34. The second reflecting mirror 17 may be povitally moved with the reflecting mirror support plate 34. A magnetic body comprises a pair of iron pieces 35a and 35b which are mounted to extend at both end of the reflecting mirror support plate 34 whose center is defined by the pin 33. The upper end of the support member 32 extends along the reflecting mirror support plate 34. A pair of electromagnets 36a and 36b which are spaced apart at a predetermined distance from the iron pieces 35a and 35b and which oppose the iron pieces 35a and 35b are mounted to the upper end of the reflecting mirror support plate 34. The electromagnets 36a and 36b are constituted by iron cores around the peripheries of which are respectively wound coils. When a DC current is supplied to the electromagnets 36a and 36b, the electromagnets 36a and 36b are energized to attract the iron pieces 35a and 35b.

The free oscillation force biasing mechanism 20 has a rod 37 which extends perpendicularly to the reflecting mirror support plate 34 at the center of the lower surface thereof. A pair of stationary pins 38a and 38b extend in opposite directions at the lower section of the rod 37. The stationary pins 38a and 38b are inserted in one end each of a pair of compression coil springs 39a and 39b which extend in the direction perpendicular to the rod 37 and the pin 33, so that the stationary pins 38a and 38b respectively support the compression coil springs 39a and 39b. A pair of extended sections 40a and 40b are so as to oppose each other, and the rod 37 is located at the center between the extended sections 40a and 40b on one side of the support member 32. Threaded holes are formed at the extended section 40a and 40b and adjusting screws 41a and 41b are screwed in the threaded holes to be coaxial with the stationary pins 38a and 38b. The base ends of the adjusting screws 41a and 41b extend outwardly, while the top ends thereof extend inwardly. Further, the top ends of the screws face the stationary pins 39a and 38b and support the other ends of the compression coil springs 39a and 39b. Therefore, the rod 37 is elastically pressed by the compression coil springs 39a and 39b from both sides. With an adjustment of the adjusting screws 41a and 41b, the biasing force or pressing force of the compression coil springs 39a and 39b may be adjusted, so that the central position as shown in FIG. 1, that is, the distance between the electromagnet 36 and the iron piece 35a, is maintained equal to the distance between the electromagnet 36b and the iron piece 35b.

The controller 21 is constituted by a start switch 51; a timer switch 52 which makes the laser oscillator 15 start the oscillation operation when the start switch 51 is turned on and which stops the oscillation operation when a predetermined period set by a timer elapses; a circuit which intermittently biases one electromagnet 36a during a period in which the start switch 51 is turned and then the laser oscillator 15 stops oscillating, the biasing period of the electromagnet 36a being arbitrarily determined by a timer switch 53; a circuit which intermittently biases the other electromagnet 36b during a period in which the start switch 51 is turned on and the laser oscillator 15 stops oscillating, the biasing period of the electromagnet 36b being arbitrarily determined by a timer switch 54; and a timer switch 56 which determines a period in which one electromagnet 36a is deenergized and the other electromagnet 36b starts operating and a period in which the other electromagnet 36b is deenergized and one electromagnet 36a starts operating.

Referring to FIG. 1, reference numeral 60 denotes a pincher which flattens the heated part of the quartz tube 11 by clamping it from both sides.

Figure 2:
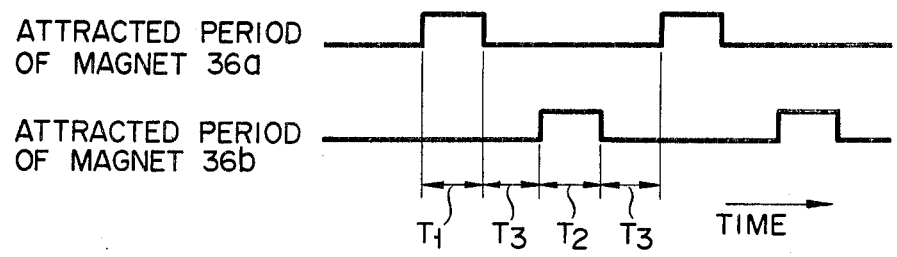
FIG. 2 is a timing chart for explaining a biasing period of two electromagnets.
Figure 3:
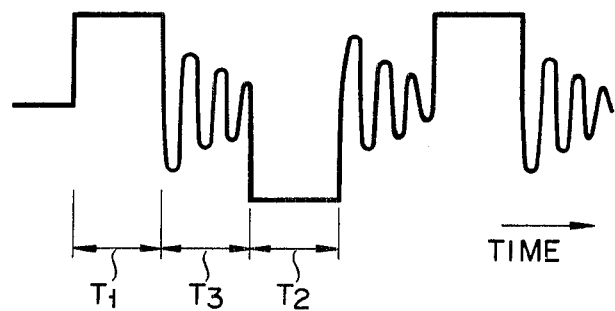
FIG. 3 is a view illustrating an oscillation waveform of a reflecting mirror.
Figure 4:
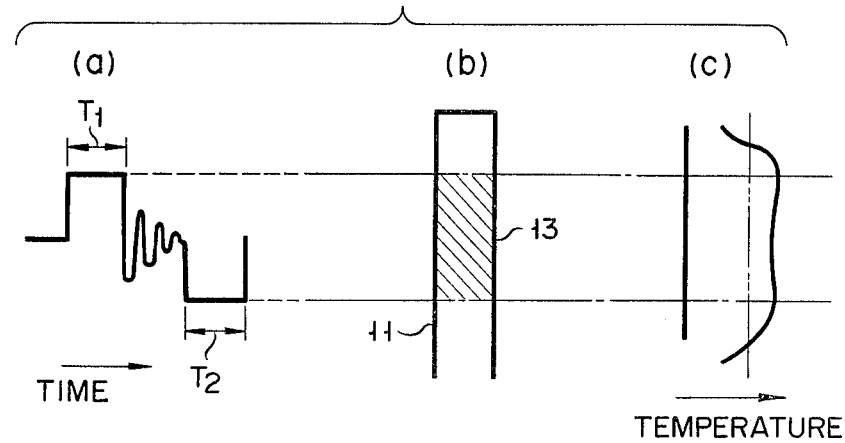
FIG. 4 shows the relationship among the oscillation waveform of the reflecting mirror, a region to be heated, and a heating temperature distribution of the heated region.

The mode of operation of the heating device with the above arrangement as shown in FIG. 1 will be described with reference to FIGS. 2 to 4.

With operation of the adjusting screws 41a and 41b, the centers of reflecting mirror support plate 34 and the second reflecting mirror 17 are aligned. At the same time, positional adjustment in the vertical direction of the quartz tube 11 is performed by the chuck mechanism 10 so that the laser beam P reflected by the second reflecting mirror 17 is incident at the central area in the axial direction of the prospective softening region or the prospective heating region 13. Further, the distance between the quartz tube 11 and the second reflecting mirror 17 is adjusted corresponding with the length in the axial direction of the prospective heating region 13 and a desired heating temperature distribution. For example, heating is performed so that a uniform temperature distribution is established throughout a length L in the axial direction of the prospective heating region 13; the distance described above is set so that a half-amplitude D of the laser beam P in the prospective heating region 13 satisfies the condition $L \leq 2D$. When this distance is determined by the condition described above, the timer switch 52 is set to a predetermined time, while the biasing periods of the electromagnets 36a and 36b and the nonbiasing periods thereof are set by the timer switches 53, 54 and 55. In this case, in order to heat the prospective heating region 13 uniformly, a biasing period T1 of one electromagnet 36a, a biasing period T2 of the other electromagnet 36b, and a nonbiasing period T3 must have a ratio of 1:1:1.

When the preparation as described above is completed, the quartz tube 11 is rotated by the chuck mechanism 10 in the direction indicated by the arrow 12. At the same time, the start switch 51 is turned on. As a result, the laser oscillator 15 is driven to emit the laser beam P. The laser beam P which is emitted by the laser oscillator 15 is reflected through a right angle at the first reflecting mirror 16 and another right angle at the second reflecting mirror 17 and is incident on the prospective heating region 13. While the laser beam P is radiated on the prospective heating region 13, with the operation of the start switch 51, one electromagnet 36a is biased for the period T1, and the other electromagnet 36b is biased for the period T2 after the nonbiasing period T3 elapses. Subsequently, after the nonbiasing period T3, the other electromagnet 36b is biased again for the period T2, and the electromagnet 36a is then biased again for the period T1 after the nonbiasing period T3 elapses. In this manner, the same operation is repeated in which the biasing of the electromagnets 36a and 36b is performed with the nonbiasing period T3 between. Therefore, the iron pieces 35a and 36b are alternatively attracted to the electromagnets 36a and 36b, respectively, for a predetermined period. In response to this, the reflecting mirror support plate 34 and the second reflecting mirror 17 pivot about the pin 33. The second reflecting mirror 17 stops at the maximum tilted position for a period in which the iron pieces 35a and 35b are attracted to the corresponding electromagnets, for example, a period of about 1/10 second, as shown in FIG. 3. When this attraction is discontinued, the movement of the second reflecting mirror 17 is damped by the biasing force of the compression springs 39a and 39b when the iron pieces are attracted. The second reflecting mirror 17 stops for the period in which the electromagnet is energized when the laser beam P is radiated on the end portion of the prospective heating region 13. For the nonbiasing period, the movement of the second reflecting mirror 17 is damped when the laser beam P is radiated on portions other than the end portion of the prospective heating region 13. As a result, the temperature drop caused by heat conduction of the quartz tube 11 is prevented in the prospective heating region 13. Therefore, as shown in FIG. 4, the heating temperature distribution in the prospective heating region 13 is kept substantially uniform. Referring to FIG. 4, symbol (a) denotes the vibration amplitude of the reflecting mirror; (b), the prospective heating region 13 of the quartz tube 11; and (c), the temperature distribution of the prospective heating region 13.

As described above, in the heating device according to the above embodiment of the present invention, the vibration mode of the second reflecting mirror 17 is controlled while maintaining a constant output of the laser oscillator 15, so that the predetermined region of the object to be heated may be heated with a constant temperature distribution, making the cost of the overall device low.

In the above embodiment, the periods T1, T2 and T3 are substantially the same to accomplish the uniform temperature distribution of the prospective heating region. However, these periods may be adjusted to accomplish various temperature distributions as needed. Alternatively, the temperature distribution may be varied by changing the vibration characteristics such as the damping frequency and the damping constant of the compressing springs since they influence the temperature distribution. The vibration characteristics may be easily changed by changing the pressing force of the compressing springs with the adjust screws or by adding a damper. In the embodiment described above, part of the waveform of the vibration of the reflecting mirror is determined as an accurate rectangular waveform. However, other waveforms in which the amplitude does not change for a predetermined period, such as a trapezoidal waveform, may be used. When a laser oscillator of high output, for example, several hundreds of watts or higher is used, the reflecting mirror is preferably cooled. In this case, cooling means such as a water cooling jacket may be mounted on the reflecting mirror support plate to accomplish this purpose. The device according to the embodiment as described above is used for the softening-pinching of the quartz tube. However, this heating device may also be used for other heating treatments such as a heat treatment of a metal. In the above embodiment, the object to be heated rotates. However, the reflecting mirror may rotate around the object to be heated while the object is maintained stationary. Further, in this embodiment, the reflecting mirror is oscillated by a combination of the assembly of the electromagnet and the iron core, and the compression springs. However, the reflecting mirror may be vibrated by another means such as a cam, an example of which will be described with reference to FIGS. 5 to 7.

Figure 5:
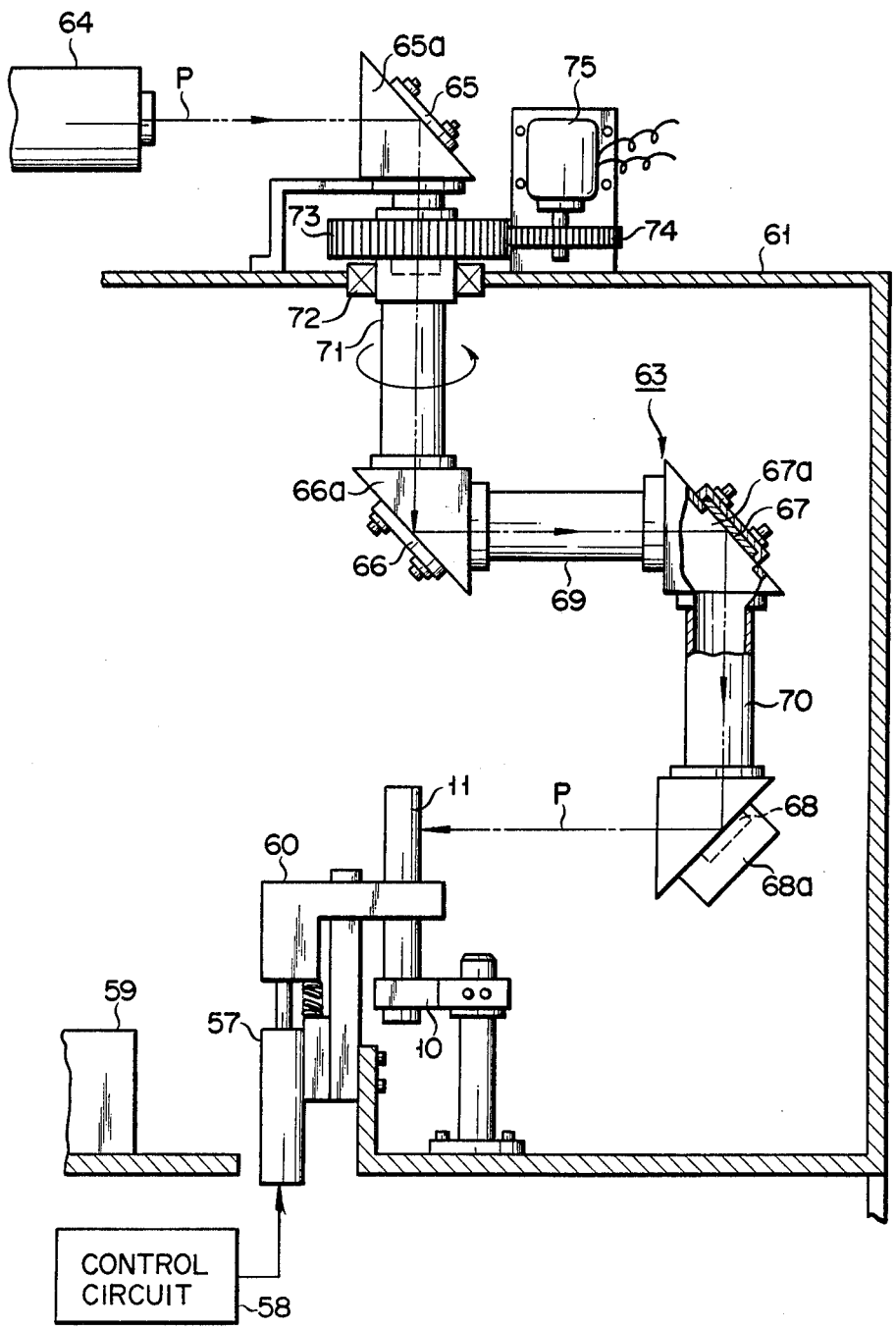
FIG. 5 is a sectional view schematically illustrating the heating device according to another embodiment of the present invention.

Referring to FIG. 5, reference numeral 61 denotes a case or housing in which the quartz tube 11 as the object to be heated is vertically supported by the chuck mechanism 10. The laser beam P is radiated on a predetermined region of the outer surface of the quartz tube 11 by a laser beam radiation system 63. The laser beam radiation system 63 has a laser oscillator 64 which is disposed outside the case 61, and a first reflecting mirror 65 which is disposed above the upper wall of the case 61, which reflects the laser beam P at right angles, and which is mounted to first support body 67a to guide the laser beam P into the case 61 vertically. Further, within the case 61 the following are mounted together so as to be freely movable: a second reflecting mirror 66 which is mounted to a second support body 66a so as to guide the laser beam P from the first reflecting mirror 65 horizontally by reflecting the laser beam P at right angles; a third reflecting mirror 67 which is mounted to a third support body 67a so as to guide the laser beam P from the second reflecting mirror 65 vertically and downwardly by reflecting the laser beam P at right angles; and a fourth reflecting mirror 68 which is mounted to a fourth support body 68a so as to guide the laser beam P horizontally to the quartz tube 11 by reflecting the laser beam P at right angles.

The first reflecting mirror 65 and the second reflecting mirror 66 are located above the quartz tube 11 so that the optical axes thereof are coaxial with the central axis of the quartz tube 11. The first support body 65a is stationary relative to the upper wall of the case 61. The second support body 66a is rotatably supported from the upper wall of the case 61 and is mounted to the lower end of a vertical cylindrical body 71, the upper end of which extends through the upper wall. The rotating shaft of the cylindrical body 71 coincides with the optical axis of the first reflecting mirror 65. A large gear 73 is mounted to be coaxial with the rotating shaft of the cylindrical body 71, at the end which extends from the upper wall of the base 61. A small gear 74 which is coaxial with the rotating shaft of a motor 76 meshes with the large gear 73. The resultant reduction gear train is driven by the motor 75 to rotate in the direction indicated by the arrow, and at the same time the second reflecting mirror 66 above the quartz tube 11 rotates in the direction indicated by the arrow about the central axis of the quartz tube 11 through the cylindrical body 71.

A horizontal cylindrical body 69 between the second support body 66a and the third support body 67a, and a vertical cylindrical body 70 between the third support body 67a and the fourth support body 68a are disposed to support the support bodies at the ends of the horizontal and vertical cylindrical bodies 69 and 70, respectively. As a result, when the second support body 66a rotates, the fourth support body 68a and simultaneously the fourth reflecting mirror 68 rotate around the periphery of the quartz tube 11 through the horizontal cylindrical body 69, the third support body 67a and the vertical cylindrical body 70.

A processing mechanism such as the pincher 60 for deformation-processing of the heated portion of the quartz tube 11 is disposed in the vicinity of the chuck mechanism 10. The pincher 60 is connected to a hydraulic cylinder piston 57 which is controlled by a hydraulic controller 58. Therefore, when the hydraulic cylinder piston 57 moves upwardly, the heated portion of the quartz tube 11 is formed and pressed by the pincher 60. When the forming is completed, the pincher 60 descends in accordance with the descending movement of the hydraulic cylinder piston 57.

Referring to FIG. 5, reference numeral 59 denotes a control unit which controls the laser oscillator 64, the motor 75, the hydraulic controller 58 and the drive mechanism which is disposed within the fourth support body 68a and which oscillates the fourth reflecting mirror 68 to be described later.

Figure 6:
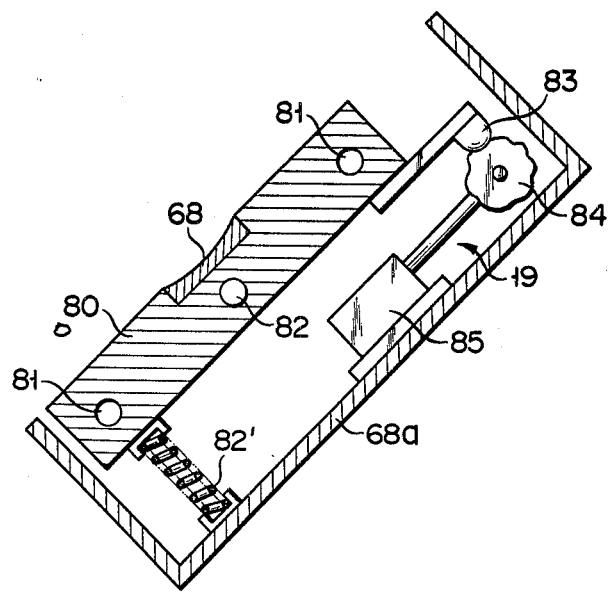
FIG. 6 is an enlarged sectional view of a support of the heating device of FIG. 5.
Figure 7:
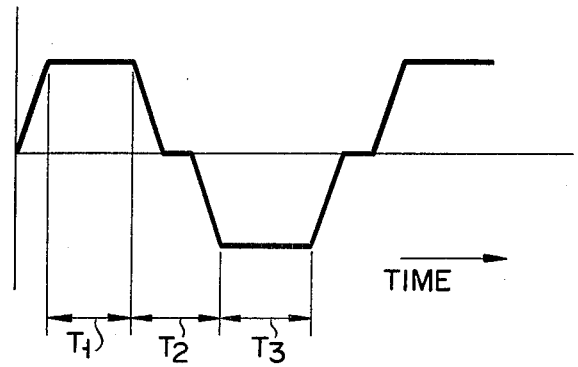
FIG. 7 is a view illustrating the oscillation waveform of the reflecting mirror of the heating device of FIG. 5.

The fourth reflecting mirror 68 is constituted by a concave mirror as shown in FIG. 6, and focuses the laser beam P on the heated region. The concave mirror 68 is mounted at the central upper surface of a reflecting mirror support plate 80 in which water cooling jackets 81 are formed. The reflecting mirror support plate 80 is mounted to the fourth support body 68a so as to be pivotal about a horizontal pin 82 at the center of the cross section of the reflecting mirror support plate 80. A compression coil spring 82' is mounted between the fourth support body 68a and the lower surface of the reflecting mirror support plate 80 in the vicinity of one end so that the compression coil spring 82 pivotally biases the reflecting mirror supporting plate 80 in the direction indicated by the arrow. A driven element 83 is mounted to the lower surface of the reflecting mirror support plate 80 in the vicinity of the other end, and engages with a cam 84 which is rotatably supported by the fourth support body 68a. When the cam 84 is rotated by a motor 85, the reflecting mirror support plate 80 is free to oscillate through the driven element 83. The cam surface of the cam 84 is set to oscillate the reflecting mirror support plate 80 and simultaneously oscillate the fourth reflecting mirror 68 with an oscillation waveform as shown in FIG. 7. The fourth reflecting mirror 68 stops at a position when the fourth reflecting mirror 68 pivots a maximum angle in the direction indicated by the arrow for the period T1. For the period T2, the fourth reflecting mirror 68 pivots a maximum angle in a direction opposite to the direction indicated by the arrow. At this position, the fourth reflecting mirror 68 stops for the nonbiasing period T3. During the period T2 in which the fourth reflecting mirror 68 pivots, the fourth reflecting mirror 68 pivots at a constant speed except for a temporary stop in the middle of the rotation. The ratio of periods T1, T2 and T3 is determined to be substantially equal. Even when the period T2 is set to be shorter than the periods T1 and T3, the heated region is entirely heated substantially uniformly, or the central portion may be heated slightly less than the other portions.

In the heating device with the arrangement according to the above embodiment of the present invention, since the fourth reflecting mirror 68 rotates around the quartz tube 11 with the vibration pattern as shown in FIG. 7, the laser beam P transmitted to the fourth reflecting mirror 68 is radiated on the periphery of the quartz tube 11, by which the entire predetermined region is heated substantially uniformly.

Obviously, numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A heating device for heating with a laser beam a predetermined range in the axial direction of an object to be heated having an axis, comprising:
    a laser oscillator which emits a laser beam,
    an optical guide member which guides the laser beam from said laser oscillator to the object to be heated,
    support means for supporting said optical guide member to pivotally oscillate said optical guide member about an axis substantially perpendicular to the axis of the object to be heated, and
    drive means for oscillating said optical guide member between a maximum titled position in a first rotational direction and a maximum tilted position in a second rotational direction opposite said first direction and for stopping said optical guide member at both maximum tilted positions for a predetermined period such that the laser beam which is incident on said optical guide member is reciprocally scanned in the axial direction of the predetermined range of the object to be heated by the oscillation of said optical guide member wherein said drive means further comprises means for oscillating said optical guide member between the maximum tilted position in said first direction and the maximum tilted position in the second direction and for stopping said optical guide member at both maximum tilted positions for a predetermined period, the stopping period at both maximum tilted positions being equal to or longer than a period of pivotal movement.

2. A heating device according to claim 1, wherein said optical guide member further comprises a reflecting mirror which reflects the incident laser beam in the direction of the object to be heated.

3. A heating device according to claim 1, wherein said support means further comprises a stationary member and a support body which is supported by said stationary member to pivot about an axis substantially perpendicular to the axis of the object to be heated and which supports said reflecting mirror on one surface.

4. A heating device according to claim 3, wherein said drive means further comprises a damping member which dampens movement of the reflecting mirror within the range between the maximum tilted positions.

5. A heating device according to claim 4, wherein said drive means further comprises a pair of magnetic bodies which are respectively mounted to said support body so as to straddle a rotating shaft of said support body; a pair of electromagnets which are disposed on said stationary member so as to oppose said magnetic bodies, respectively, and which attract the corresponding magnetic bodies; and spring means for biasing the reflecting mirror toward the center between the maximum tilted positions and which constitute said damping member.

6. A heating device according to claim 5, wherein said drive means further comprises means for adjusting a biasing force of the spring.

7. A heating device for heating with a laser beam a predetermined range in the axial direction of an object to be heated having an axis, comprising:
    a laser oscillator which emits a laser beam,
    an optical guide member which guides the laser beam from said laser oscillator to the object to be heated,
    support means for supporting said optical guide member to pivotally oscillate said optical guide member about an axis substantially perpendicular to the axis of the object to be heated, and
    drive means for oscillating said optical guide member between a maximum titled position in a first rotational direction and a maximum tilted position in a second rotational direction opposite said first direction and for stopping said optical guide member at both maximum tilted positions for a predetermined period such that the laser beam which is incident on said optical guide member is reciprocally scanned in the axial direction of the predetermined range of the object to be heated by the oscillation of said optical guide member, wherein said support means further comprises a stationary member and a support body which is supported by said stationary member to pivot about an axis substantially perpendicular to the axis of the object to be heated and which supports said reflecting mirror on one surface, and wherein said drive means further comprises means for stopping the reflecting mirror at a central position between the maximum tilted positions for a predetermined period.

8. A heating device according to claim 7, wherein said drive means further comprises means for pivoting the reflecting mirror between the central position and the maximum tilted positions at a constant speed.

9. A heating device for heating with a laser beam a predetermined range in the axial direction of an object to be heated having an axis, comprising:
- a laser oscillator which emits a laser beam,
- an optical guide member which guides the laser beam from said laser oscillator to the object to be heated,
- support means for supporting said optical guide member to pivotally oscillate said optical guide member about an axis substantially perpendicular to the axis of the object to be heated, and
- drive means for oscillating said optical guide member between a maximum titled position in a first rotational direction and a maximum tilted position in a second rotational direction opposite said first direction and for stopping said optical guide member at both maximum tilted positions for a predetermined period such that the laser beam which is incident on said optical guide member is reciprocally scanned in the axial direction of the predetermined range of the object to be heated by the oscillation of said optical guide member wherein said drive means further comprises means for stopping said optical guide member at a central position between the maximum tilted positions for a predetermined period.

10. A heating device according to claim 9, wherein said drive means further comprises means for pivoting the optical guide member between the central position and the maximum tilted positions at a constant speed.

* * * * *